Figure 1:
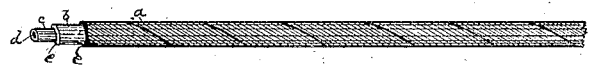

(No Model.)

A. C. TICHENOR.
ELECTRIC CONDUCTOR.

No. 300,410. Patented June 17, 1884.

Witnesses:
Geo. A. Dickson
G. W. Emerson

Inventor:
Anson C. Tichenor
by
V. R. Abbom Atty.

UNITED STATES PATENT OFFICE.

ANSON COLEMAN TICHENOR, OF ALAMEDA, CALIFORNIA.

ELECTRIC CONDUCTOR.

SPECIFICATION forming part of Letters Patent No. 300,410, dated June 17, 1884.

Application filed September 15, 1883. (No model.)

*To all whom it may concern:*

Be it known that I, ANSON C. TICHENOR, a citizen of the United States, residing at Alameda, county of Alameda, State of California, have made and invented certain new and useful Improvements in Electric Conductors; and I do hereby declare that the following is a full, clear, and exact description of the same, the accompanying drawings being referred to by figures and letters.

My invention relates to the production of electric cables or conductors for transmitting electric currents.

It consists in forming an electric conductor from pulverized carbon by inclosing or incasing a body of carbon of any required length in a tubular case, cover, or wrapper, and also in producing an electric cable or conductor for general purposes in telegraph, telephone, and other systems wherein electricity is employed by inclosing a body of carbon in a tubular wrapping, case or envelope of a material or substance having suitable flexibility or pliability, and then covering or coating this case or envelope with a protective insulating compound, substance, or material, as hereinafter described.

The following description fully explains the nature of my said invention and the manner in which I proceed to produce, make, carry out, and employ the same.

I can proceed in several ways to produce an electric cable or conductor in accordance with my invention, and I wish it to be understood that I do not confine myself to any particular method or process of inclosing a body of carbon in a cylindrical form, and of any required length for conducting purposes, for the essential feature of my improvement consists in the employment of a body of carbon as a conducting core or medium in a cable or conductor in place of and as a substitute for a metallic wire. The carbon in a finely divided or pulverized condition is placed in the center of a case, covering, or envelope, preferably of a cylindrical form, and of any length, as required. It is firmly packed or compressed, but not to a degree sufficient to destroy or affect the pliability of the finished cable. The case or envelope may be a continuous tube of any practical length, and the carbon forced into it by means of a plunger, or by using a blast of compressed air. The method of production preferred by me, and which I now employ, is designed to turn out a flexible or pliable cable suitable for general use. To produce such cable I proceed as follows: A quantity of carbon in the form readily obtained from the retorts of gas-works is brought to a finely-powdered condition by passing it through a pulverizing-mill, and afterward, if necessary, subjecting it to a sifting operation. In this condition the carbon is formed into a close compact body of or approaching a cylindrical shape by inclosing it in a wrapping of fiber—such as jute or hemp—or by using strips of woven fabric—such as cotton cloth. In this operation I follow the method now employed in the manufacture of fuses for blasting purposes, the pulverized carbon being substituted for the powder in the operation. I thus obtain a core of carbon, which I then cover with several layers of a length of cloth or fabric wound spirally one over the other. Upon each layer or covering I apply a coat of asphaltum, rubber, paraffine, or other suitable substance or material having qualities capable of resisting moisture and the action of the elements, and over the last and outermost covering I apply a surface of asbestus, asphaltum, or other suitable protective compound. I employ as many of these coverings or wrappings as I find to be necessary in order to give the requisite strength to the completed cable. These several steps or operations can be well carried out by using the machinery and processes now at this time employed in the manufacture of submarine fuse for blasting; and I do not consider it necessary, therefore, to describe more specifically the particulars of each step, nor the machinery required to wrap the carbon. The resulting cable thus produced is a pliable conductor having a core or conducting portion of carbon incased in a tubular case or protecting-envelope.

Figure 2:

In the accompanying drawings, herein referred to, Figure 1 shows a length of cable or conductor with the several wrappings at one end removed. Fig. 2 is a cross-section.

*a* is the outermost case or wrapping; *b* and *c*, the inner envelopes; *d*, the core or body of carbon, and *e e* the protecting-coating of asphaltum or other substance applied to each layer or wrapping.

Having thus fully described my invention, what I claim, and desire to secure by Letters Patent, is—

1. A flexible cable or conductor for electrical purposes, consisting of a carbon core and an outer inclosing and protecting cover, case, or envelope, substantially as described.

2. An electric cable or conductor composed of a center of carbon, a wrapping of textile or fibrous material, and a superposed coating of non-conducting material, substantially as set forth.

3. An electric cable or conductor for transmitting electric currents, composed of a flexible or pliable tube containing a body of pulverized carbon.

ANSON COLEMAN TICHENOR. [L. S.]

Witnesses:
EDWARD E. OSBORN,
G. W. EMERSON,